United States Patent
Wu et al.

(10) Patent No.: US 11,343,172 B2
(45) Date of Patent: May 24, 2022

(54) METHOD OF ACTIVATING AND DEACTIVATING A DATA DUPLICATION AND TERMINAL THEREOF

(71) Applicant: VIVO MOBILE COMMUNICATION CO., LTD., Guangdong (CN)

(72) Inventors: Yumin Wu, Chang'an Dongguan (CN); Ran Yue, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 24 days.

(21) Appl. No.: 16/635,498

(22) PCT Filed: Jul. 27, 2018

(86) PCT No.: PCT/CN2018/097493
§ 371 (c)(1),
(2) Date: Jan. 30, 2020

(87) PCT Pub. No.: WO2019/024792
PCT Pub. Date: Feb. 7, 2019

(65) Prior Publication Data
US 2020/0236033 A1    Jul. 23, 2020

(30) Foreign Application Priority Data
Aug. 2, 2017  (CN) .......................... 201710653468.4

(51) Int. Cl.
*H04L 45/24*    (2022.01)
*H04W 76/15*    (2018.01)
(Continued)

(52) U.S. Cl.
CPC ......... *H04L 45/24* (2013.01); *H04W 28/0252* (2013.01); *H04W 76/15* (2018.02); *H04W 80/02* (2013.01)

(58) Field of Classification Search
CPC . H04W 28/0252; H04W 76/15; H04W 80/02; H04L 45/24; H04L 1/08
See application file for complete search history.

(56) References Cited

U.S. PATENT DOCUMENTS

2009/0016301 A1   1/2009  Sammour et al.
2015/0085791 A1*  3/2015  Baghel ................... H04W 4/06
                                                              370/329
(Continued)

FOREIGN PATENT DOCUMENTS

WO     2018/200584 A1    11/2018

OTHER PUBLICATIONS

"Technical Specification Group Radio Access Network; NR; Medium Access Conlrol (MAC) protocol specification" 3GPP TS 38.321, Aug. 2017.

(Continued)

*Primary Examiner* — Gary Mui
(74) *Attorney, Agent, or Firm* — Maschoff Brennan

(57) ABSTRACT

A method of activating and deactivating data duplication and a terminal thereof are provided. The method of activating and deactivating data duplication includes: receiving, by a protocol layer entity of the terminal, a command sent by a network side for deactivating or activating a data duplication of a bearer; and instructing, by the protocol layer entity, other protocol layers of the terminal to deactivate or activate a data duplication function of the bearer.

20 Claims, 6 Drawing Sheets

(51) Int. Cl.
*H04W 28/02* (2009.01)
*H04W 80/02* (2009.01)

(56) References Cited

U.S. PATENT DOCUMENTS

| | | | |
|---|---|---|---|
| 2016/0308776 A1* | 10/2016 | Ozturk | H04L 47/365 |
| 2017/0041766 A1* | 2/2017 | Vajapeyam | H04L 5/0055 |
| 2018/0098250 A1* | 4/2018 | Vrzic | H04W 36/0016 |
| 2018/0160344 A1* | 6/2018 | Zhang | H04W 72/0426 |
| 2018/0199315 A1* | 7/2018 | Hong | H04W 88/10 |
| 2018/0279262 A1* | 9/2018 | Babaei | H04W 72/04 |
| 2018/0309660 A1* | 10/2018 | Loehr | H04W 76/15 |
| 2018/0324641 A1* | 11/2018 | Tsai | H04L 69/321 |
| 2018/0324642 A1* | 11/2018 | Yu | H04L 1/22 |
| 2018/0367288 A1* | 12/2018 | Vrzic | H04W 36/0069 |
| 2018/0367463 A1* | 12/2018 | Jose | H04L 1/189 |
| 2019/0289489 A1* | 9/2019 | Yi | H04L 1/189 |
| 2020/0029379 A1* | 1/2020 | Xiao | H04L 1/22 |
| 2020/0037151 A1* | 1/2020 | Du | H04L 1/22 |
| 2020/0119864 A1* | 4/2020 | Xu | H04L 1/08 |
| 2020/0120522 A1* | 4/2020 | Xiao | H04W 76/15 |
| 2020/0186292 A1* | 6/2020 | Zou | H04W 28/12 |
| 2020/0235869 A1* | 7/2020 | Pradas | H04L 1/188 |
| 2021/0144583 A1* | 5/2021 | Xiao | H04L 5/00 |

OTHER PUBLICATIONS

"Consideration on the activation/deactivation of data duplication for CA" 3GPP TSG-RAN WG2 Meeting #98, May 15, 2017.
"Enable/DisablePDCP Duplication" 3GPP TSG-RAN2 Meeting #98, May 15, 2017.
"Activation/Deactivation of Packet Duplication" 3GPP TSG RAN WG2 NR AdHoc, Jun. 27, 2017.
Written Opinion and International Search Report in Application No. PCT/CN2018/097493 dated Feb. 13, 2020.
European Search Report in Application No. 18841832.1 dated May 29, 2020.
ZTE, "Consideration on the Activation/Deactivation of Data Duplication for CA," 3GPP TSG-RAN WG2 Meeting #98, R2-1704660, pp. 3 (May 2017).
Sharp,"Enable/Disable PDCP Duplication," 3GPP TSG-RAN2 Meeting #98, R2-1704941, pp. 2 (May 2017).

* cited by examiner

--Prior Art--

--Prior Art--

METHOD OF ACTIVATING AND DEACTIVATING A DATA DUPLICATION AND TERMINAL THEREOF

CROSS-REFERENCE TO RELATED APPLICATION

This application is the U.S. national phase of PCT Application PCT/CN2018/097493 filed on Jul. 27, 2018, which claims a priority to Chinese Patent Application No. 201710653468.4 filed in China on Aug. 2, 2017, the disclosure of which is incorporated herein in its entirety by reference.

TECHNICAL FIELD

The present disclosure relates to field of communication technologies, and in particular, to a method of activating and deactivating a data duplication and a terminal thereof.

BACKGROUND

The function of Packet Data Convergence Protocol (PDCP) data duplication (PDCP duplication) refers to that the network side configures whether the PDCP layer of the Radio Bearer (RB) of the User Equipment (UE), after duplicating the data of PDCP entity, send the duplicated data through two (or more) different paths (such as through two different Radio Link Control (RLC) entities), and different RLC entities correspond to different logical channels.

The PDCP data duplication function may indicate through a Medium Access Control Control Element (MAC CE) whether to start (i.e., activate) or stop (i.e., deactivate). When the network side configures the PDCP data duplication function of the RB, the network side may configure whether the function is enabled immediately after be configured, that is, the MAC CE signaling is not required to be activated.

In the 5G system, due to the use of Dual Connectivity (DC) architecture (including a Master Cell Group (MCG) and a Secondary Cell Group (SCG)), the bearer types of PDCP data duplication function include the two types shown in FIG. 1 and FIG. 2:

Duplicate bearer shown in FIG. 1: the PDCP entity, two (or more) RLC entities and one MAC entity corresponding to one duplicate bearer are in one cell group.

Split bearer shown in FIG. 2: the PDCP entity corresponding to the split bearer is in one cell group, and the two (or more) RLC entities and two (or more) MAC entities corresponding to the split bearer are in another cell group.

When the PDCP duplication is activated or deactivated on the network side, if a protocol layer entity of the terminal receives the activating or deactivating command, the activating or deactivating command cannot be notified to other protocol layers. As a result, the other protocol layer entities may send unwanted data, resulting in a waste of data transmission.

SUMMARY

The present disclosure is to provide a method of activating and deactivating a data duplication and a terminal thereof, to notify other protocol layers of the activating or deactivating information received by a certain protocol layer entity of the terminal, thereby reducing the waste of data transmission.

To solve the above technical issue, the following technical solutions are provided in the present disclosure.

In a first aspect, a method of activating and deactivating a data duplication is provided in the embodiments of the present disclosure, applied to a terminal, including:

receiving, by a protocol layer entity of the terminal, a command sent by a network side for deactivating or activating a data duplication of a bearer; and instructing, by the protocol layer entity, other protocol layers of the terminal to deactivate or activate a data duplication function of the bearer.

In a second aspect, a terminal is provided in the embodiments of the present disclosure, including a plurality of protocol layer entities, where the protocol layer entity is configured to: receive a command sent by a network side for deactivating or activating a data duplication of a bearer; and instruct other protocol layers of the terminal to deactivate or activate a data duplication function of the bearer.

In a third aspect, a terminal is provided in the embodiments of the present disclosure, including: a memory, a processor and a computer program stored in the memory and executable on the processor, and the computer program is executed by the processor to perform the method of activating and deactivating data duplication hereinabove.

In a fourth aspect, a computer-readable storage medium is provided in the embodiments of the present disclosure, where a computer program is stored in the computer-readable storage medium, and the computer program is executed by a processor to perform the method of activating and deactivating data duplication hereinabove.

DETAILED DESCRIPTION

In the following, the technical solutions in the embodiments of the present disclosure will be clearly and completely described with reference to the drawings in the embodiments of the present disclosure. Obviously, the described embodiments are only part of the embodiments of the present disclosure, but not all of the embodiments. Based on the embodiments of the present disclosure, all other embodiments obtained by a person of ordinary skill in the art without creative work shall fall within the scope of the present disclosure.

In view of the technical issue in the related art that the behaviors of the protocol layers of the UE cannot be consistent with each other when PDCP duplication is activated or deactivated on the network side, resulting in a waste of data transmission, a method of activating and deactivating a data duplication and a terminal thereof are provided in the embodiments of the present disclosure, to notify other protocol layers of the activating or deactivating information received by a certain protocol layer entity of the terminal, thereby reducing the waster of data transmission.

Figure 1:
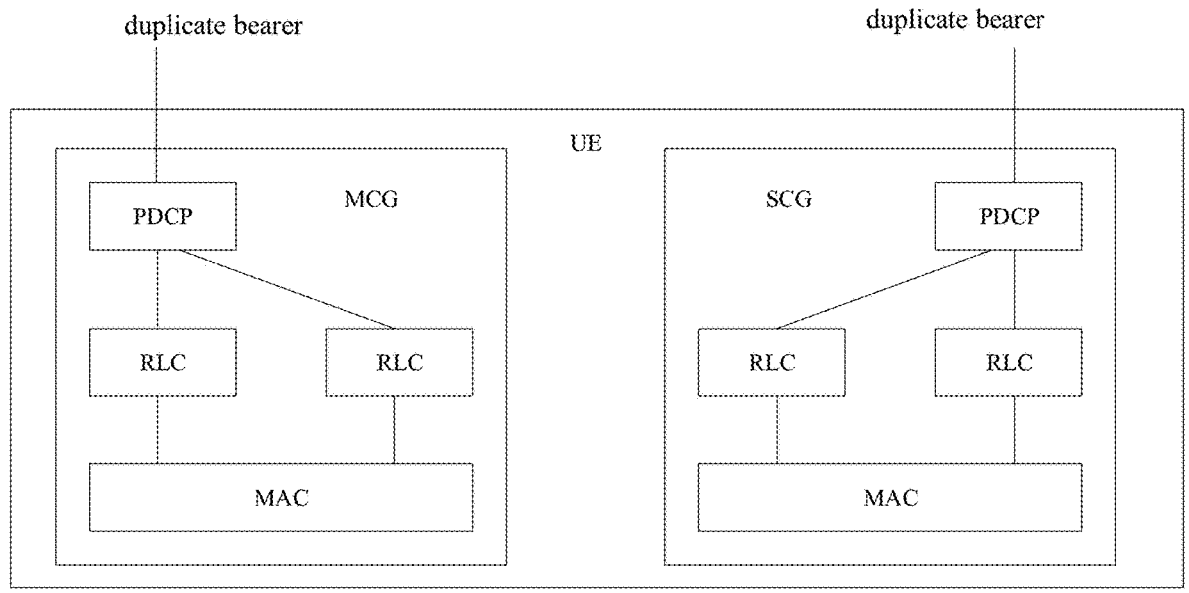
FIG. 1 is a schematic view of a duplicated bearer in a communication system in the related art.
Figure 2:
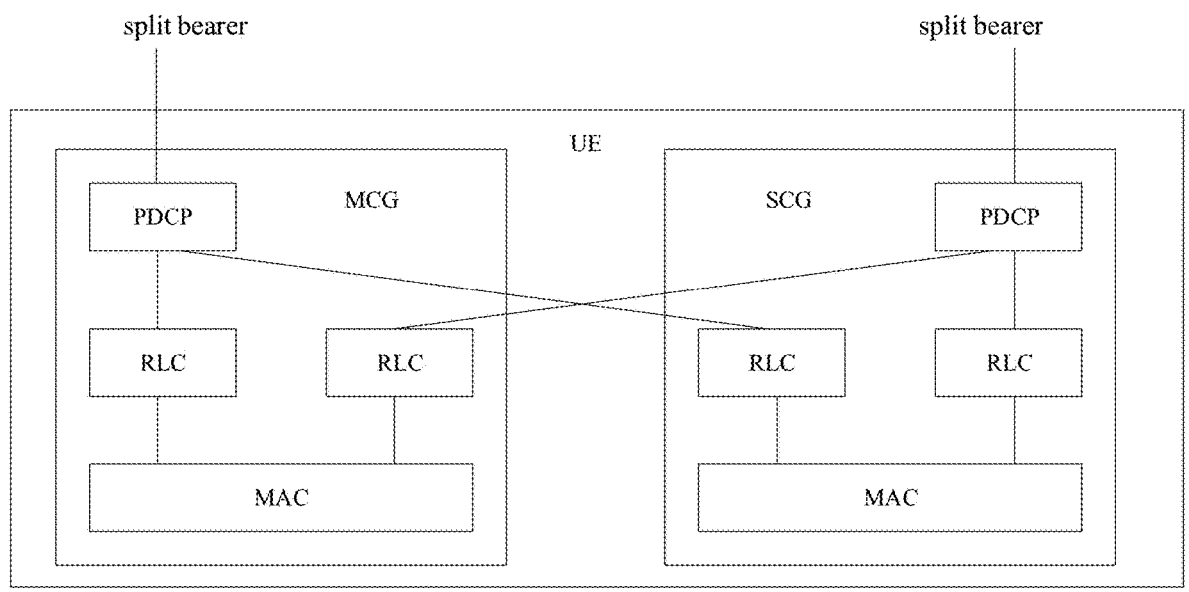
FIG. 2 is a schematic view of a split bearer in a communication system in the related art.
Figure 3:
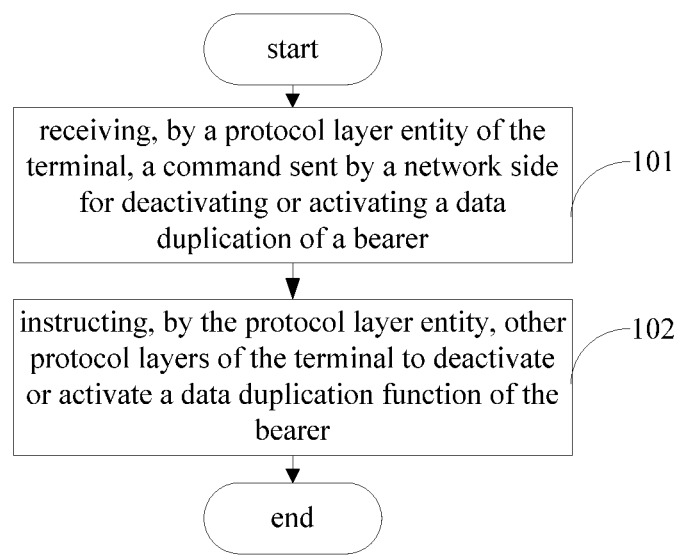
FIGS. 3 to 7 are flowcharts of a method of activating and deactivating data duplication in the embodiments of the present disclosure.

A method of activating and deactivating a data duplication is provided in the embodiments of the present disclosure, applied to a terminal. As shown in FIG. 3, the method includes:

Step 101: receiving, by a protocol layer entity of the terminal, a command sent by a network side for deactivating or activating a data duplication of a bearer; and Step 102: instructing, by the protocol layer entity, other protocol layers of the terminal to deactivate or activate a data duplication function of the bearer.

According to the above embodiment, when the network side activates or deactivates the PDCP data duplication function, one of the protocol layer entities of the terminal needs to exchange information among different protocol layers of the terminal after receiving a command for activating or deactivating the data duplication, to make the functions of different protocol layers to be coincident with each other after the PDCP duplication functions of the different protocol layers are activated or deactivated and make the UE behaviors of different protocol layer entities to be coincident with each other after the duplication is deactivated or activated, thereby reducing the waster of data transmission.

The command sent by the network side for deactivating or activating the data duplication of the bearer may be received by an MAC entity or a Radio Resource Control (RRC) entity of the terminal. After receiving the command sent by the network side for deactivating or activating the data duplication of the bearer, the MAC entity or RRC entity exchanges the signaling with other protocol layer entities so as to make the entity behaviors of different protocol layer entities to be coincident with each other after the PDCP duplication functions are activated or deactivated.

Further, when the PDCP duplication is deactivated, the PDCP entity needs to discard the duplicated data, and the MAC entity also needs to discard the duplicated data, thereby saving the overhead of network resources and the transmission power overhead of the UE.

The method of activating and deactivating data duplication of the present disclosure is further described in combination with the embodiments below:

Embodiment One

In this embodiment, the MAC entity of the terminal receives a command sent by the network side for deactivating a PDCP duplication of a bearer.

Figure 4:
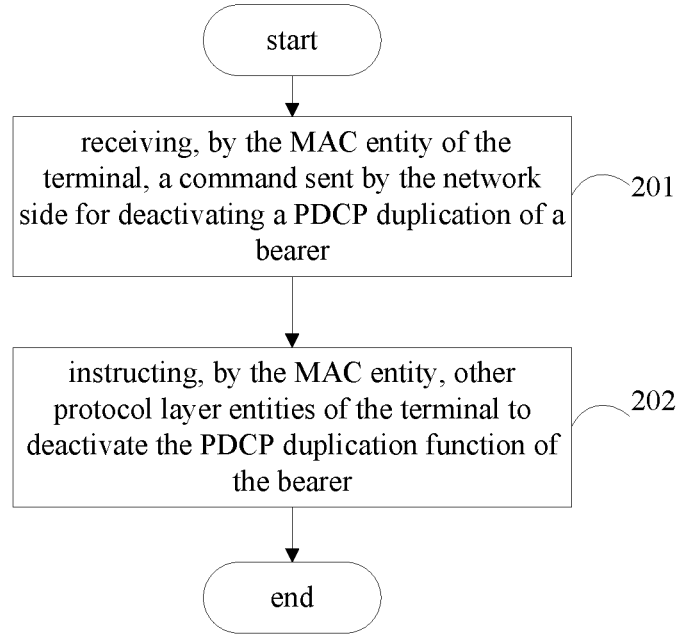

As shown in FIG. 4, the method of activating and deactivating PDCP duplication in this embodiment includes the following steps:

Step 201: receiving, by the MAC entity of the terminal, a command sent by the network side for deactivating a PDCP duplication of a bearer;

The network side sends a MAC CE to deactivate a PDCP duplication of a bearer. The MAC entity of the UE receives the MAC CE sent by the network side.

Step 202: instructing, by the MAC entity, other protocol layer entities of the terminal to deactivate the PDCP duplication function of the bearer, where the other protocol layer entities include a PDCP entity and an RLC entity.

According to the above embodiment, after receiving the MAC CE command sent by the network side, the MAC entity of the UE instructs other protocol layer entities to deactivate the functions related to the PDCP duplication and exchange information among different protocol layers of the terminal, to make the functions of different protocol layers to be coincident with each other after the PDCP duplication functions are deactivated and make the behaviors of different protocol layer entities to be coincident with each other after the duplication is deactivated, thereby reducing the waste of data transmission. Specifically, the instructing, by the MAC entity, other protocol layer entities of the terminal to deactivate the PDCP duplication function of the bearer includes:

instructing, by the MAC entity, the PDCP entity of the bearer to deactivate the PDCP duplication function; and/or instructing, by the MAC entity, the RLC entity of which the PDCP duplication function is to be deactivated by the bearer, to deactivate the PDCP duplication function.

The RLC entity of which the PDCP duplication function is to be deactivated by the bearer is configured by the network side or agreed in a communication protocol.

Prior to the instructing, by the MAC entity, the RLC entity of which the PDCP duplication function is to be deactivated by the bearer, to deactivate the PDCP duplication function, the method further includes:

determining, by the MAC entity, according to a configuration of the network side, the RLC entity of which the data duplication function is to be deactivated by the bearer.

Subsequent to the instructing by the MAC entity the PDCP entity of the bearer to deactivate the PDCP duplication function, the PDCP entity instructs discarding the duplicated data packet not sent successfully, the instructing information includes any one or any combination of:

discarding, by the PDCP entity of the bearer, a duplicated data packet not sent successfully;

instructing the other protocol layer entities to discard the duplicated data packet not sent successfully.

The discarding, by the PDCP entity of the bearer, the duplicated data packet not sent successfully includes:

discarding, by the PDCP entity of the bearer, any duplicated data packet that has not been successfully sent, for example, any one of 2 duplicated data packets 1 may be discarded; and/or discarding, by the PDCP entity, a data packet to be sent to the RLC entity of which the PDCP duplication function is to be deactivated by the bearer.

The instructing the other protocol layer entities to discard the duplicated data packet not sent successfully includes:

instructing, by the PDCP entity, the RLC entity of which the PDCP duplication function is to be deactivated by the bearer, to discard the duplicated data packet not sent successfully; and/or instructing, by the PDCP entity, the MAC entity to discard the duplicated data packet not sent successfully.

Further, after the MAC entity receives the command sent by the network side for deactivating the PDCP duplication of the bearer, or receives an indication sent by the PDCP entity that indicates the duplicated data packet has not been successfully sent, the MAC entity discards the data of the RLC entity of which the PDCP duplication function is to be deactivated by the bearer.

The data of the above RLC entity includes any one or any combination of:

a RLC Protocol Data Unit (PDU) from the deactivated RLC entity of the bearer.

an MAC control signaling (such as the corresponding MAC subheader) generated according to the RLC PDU from the deactivated RLC entity of the bearer.

Therefore, the discarding by the MAC entity the data of the RLC entity of which the PDCP duplication function is to be deactivated by the bearer includes:

discarding, by the MAC entity, an RLC protocol data unit from the RLC entity of which the PDCP duplication function is to be deactivated by the bearer; and/or discarding, by the MAC entity, an MAC control signaling generated according to the RLC protocol data unit.

Embodiment Two

In this embodiment, the MAC entity of the terminal receives a command sent by the network side for activating a PDCP duplication of a bearer.

Figure 5:
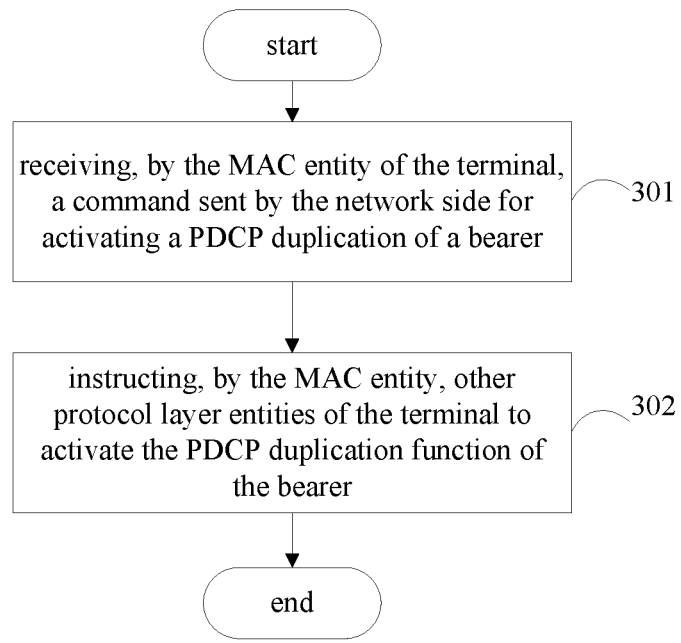

As shown in FIG. 5, the method of activating and deactivating PDCP duplication in this embodiment includes the following steps:

Step 301: receiving, by the MAC entity of the terminal, a command sent by the network side for activating a PDCP duplication of a bearer;

The network side sends a MAC CE to activate a PDCP duplication of a bearer. The MAC entity of the UE receives the MAC CE sent by the network side.

Step 202: instructing, by the MAC entity, other protocol layer entities of the terminal to activate the PDCP duplication function of the bearer, where the other protocol layer entities include a PDCP entity and an RLC entity.

According to the above embodiment, after receiving the MAC CE command sent by the network side, the MAC entity of the UE instructs other protocol layer entities to activate the functions related to the PDCP duplication and exchange information among different protocol layers of the terminal, to make the functions of different protocol layers to be coincident with each other after the PDCP duplication functions are activated and make the behaviors of different protocol layer entities to be coincident with each other after the duplication is activated. Specifically, the instructing, by the MAC entity, other protocol layer entities of the terminal to activate the PDCP duplication function of the bearer includes:

instructing, by the MAC entity, the PDCP entity of the bearer to activate the PDCP duplication function; and/or instructing, by the MAC entity, the RLC entity of which the PDCP duplication function is to be activated by the bearer, to activate the PDCP duplication function.

The RLC entity of which the PDCP duplication function is to be activated by the bearer is configured by the network side or agreed in a communication protocol.

Prior to the instructing, by the MAC entity, the RLC entity of which the PDCP duplication function is to be activated by the bearer, to activate the PDCP duplication function, the method further includes:

determining, by the MAC entity, according to a configuration of the network side, the RLC entity of which the data duplication function is to be activated by the bearer.

Example Three

In this embodiment, the network side configures the state of the PDCP duplication bearer to be deactivating, by sending an RRC message, and the RRC entity of the terminal receives the RRC message (i.e., a configuration command) sent by the network side.

Figure 6:
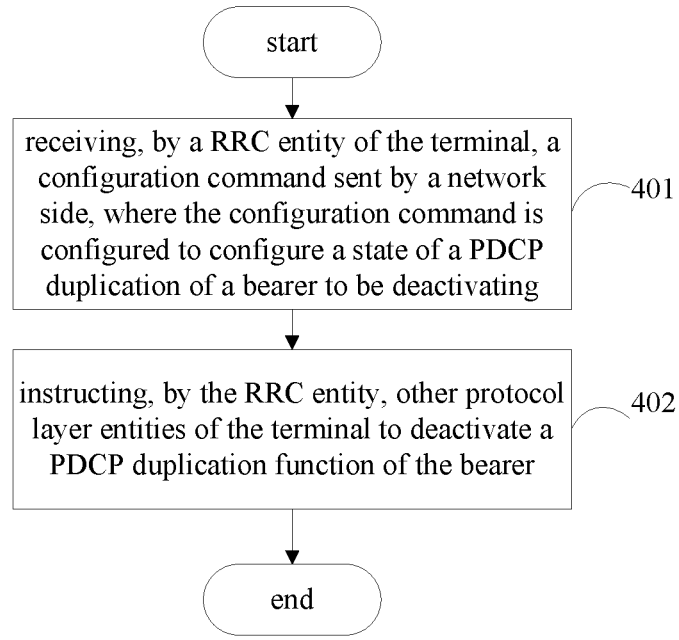

As shown in FIG. 6, the method of activating and deactivating PDCP duplication in this embodiment includes the following steps:

Step 401: receiving, by a RRC entity of the terminal, a configuration command sent by a network side, where the configuration command is configured to configure a state of a PDCP duplication of a bearer to be deactivating.

The network side sends an RRC message to configure the state of the PDCP duplication of a certain bearer to be deactivating, and the RRC entity of the terminal receives the RRC message.

Step 402: instructing, by the RRC entity, other protocol layer entities of the terminal to deactivate a PDCP duplication function of the bearer, where the other protocol layer entities include an MAC entity, a PDCP entity and an RLC entity.

According to the above embodiment, after receiving the RRC message for configuring the state of the PDCP duplication of a certain bearer to be deactivating, the RRC entity of the UE instructs other protocol layer entities to deactivate the functions related to the PDCP duplication and exchange information among different protocol layers of the terminal, to make the functions of different protocol layers to be coincident with each other after the PDCP duplication functions are deactivated and make the behaviors of different protocol layer entities to be coincident with each other after the duplication is deactivated. Specifically, the instructing, by the RRC entity, the other protocol layer entities of the terminal to deactivate the PDCP duplication function of the bearer includes:

instructing, by the RRC entity, the PDCP entity of the bearer to deactivate the PDCP duplication function; and/or instructing, by the RRC entity, the RLC entity of which the PDCP duplication function is to be deactivated by the bearer, to deactivate the PDCP duplication function; and/or instructing, by the RRC entity, the MAC entity of the bearer to deactivate the PDCP duplication function of the bearer.

The RLC entity of which the PDCP duplication function is to be deactivated by the bearer is configured by the network side or agreed in a communication protocol.

Prior to the instructing, by the RRC entity, the RLC entity of which the PDCP duplication function is to be deactivated by the bearer, to deactivate the PDCP duplication function, the method further includes:

determining, by the RRC entity, according to a configuration of the network side, the RLC entity of which the data duplication function is to be deactivated by the bearer.

Subsequent to the instructing by the RRC entity the PDCP entity of the bearer to deactivate the PDCP duplication function, the PDCP entity instructs discarding the duplicated data packet not sent successfully, the instructing information includes any one or any combination of:

discarding, by the PDCP entity of the bearer, a duplicated data packet not sent successfully; and/or instructing the other protocol layer entities to discard the duplicated data packet not sent successfully.

The discarding, by the PDCP entity of the bearer, the duplicated data packet not sent successfully includes:

discarding, by the PDCP entity of the bearer, any duplicated data packet that has not been successfully sent, for example, any one of 2 duplicated data packets 1 may be discarded; and/or discarding, by the PDCP entity, a data packet to be sent to the RLC entity of which the PDCP duplication function is to be deactivated by the bearer.

The instructing the other protocol layer entities to discard the duplicated data packet not sent successfully includes:

instructing, by the PDCP entity, the RLC entity of which the PDCP duplication function is to be deactivated by the bearer, to discard the duplicated data packet not sent successfully; and/or instructing, by the PDCP entity, the MAC entity to discard the duplicated data packet not sent successfully.

Further, after the MAC entity receives the command sent by the RRC entity for deactivating the PDCP duplication of the bearer, or receives an indication sent by the PDCP entity that indicates the duplicated data packet has not been successfully sent, the MAC entity discards the data of the RLC entity of which the PDCP duplication function is to be deactivated by the bearer.

The data of the above RLC entity includes any one or any combination of:

a RLC Protocol Data Unit (PDU) from the deactivated RLC entity of the bearer.

an MAC control signaling (such as the corresponding MAC subheader) generated according to the RLC PDU from the deactivated RLC entity of the bearer.

Therefore, the discarding by the MAC entity the data of the RLC entity of which the PDCP duplication function is to be deactivated by the bearer includes:

discarding, by the MAC entity, an RLC protocol data unit from the RLC entity of which the PDCP duplication function is to be deactivated by the bearer; and/or discarding, by the MAC entity, an MAC control signaling generated according to the RLC protocol data unit.

Example Four

In this embodiment, the network side configures the state of the PDCP duplication bearer to be activating, by sending an RRC message, and the RRC entity of the terminal receives the RRC message (i.e., a configuration command) sent by the network side.

Figure 7:
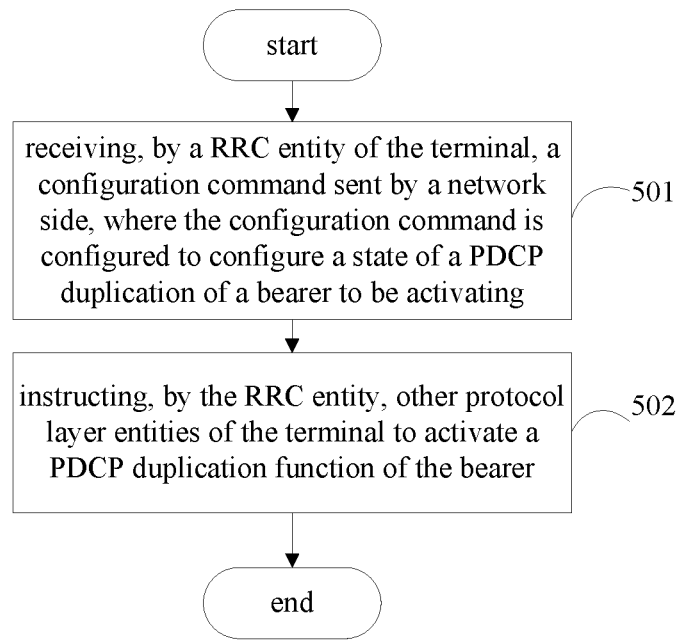

As shown in FIG. 7, the method of activating and deactivating PDCP duplication in this embodiment includes the following steps:

Step 501: receiving, by a RRC entity of the terminal, a configuration command sent by a network side, where the configuration command is configured to configure a state of a PDCP duplication of a bearer to be activating.

The network side sends an RRC message to configure the state of the PDCP duplication of a certain bearer to be activating, and the RRC entity of the terminal receives the RRC message.

Step 502: instructing, by the RRC entity, other protocol layer entities of the terminal to activate a PDCP duplication function of the bearer, where the other protocol layer entities include an MAC entity, a PDCP entity and an RLC entity.

According to the above embodiment, after receiving the RRC message for configuring the state of the PDCP duplication of a certain bearer to be activating, the RRC entity of the UE instructs other protocol layer entities to deactivate the functions related to the PDCP duplication and exchange information among different protocol layers of the terminal, to make the functions of different protocol layers to be coincident with each other after the PDCP duplication functions are activated and make the behaviors of different protocol layer entities to be coincident with each other after the duplication is activated. Specifically, the instructing, by the RRC entity, the other protocol layer entities of the terminal to activate the PDCP duplication function of the bearer includes:

instructing, by the RRC entity, the PDCP entity of the bearer to activate the PDCP duplication function; and/or instructing, by the RRC entity, the RLC entity of which the PDCP duplication function is to be activated by the bearer, to activate the PDCP duplication function; and/or instructing, by the RRC entity, the MAC entity of the bearer to activate the PDCP duplication function of the bearer.

The RLC entity of which the PDCP duplication function is to be activated by the bearer is configured by the network side or agreed in a communication protocol.

Prior to the instructing, by the RRC entity, the RLC entity of which the PDCP duplication function is to be activated by the bearer, to activate the PDCP duplication function, the method further includes:

determining, by the RRC entity, according to a configuration of the network side, the RLC entity of which the data duplication function is to be activated by the bearer.

A terminal is further provided in the embodiments of the present disclosure, including a plurality of protocol layer entities, where the protocol layer entity is configured to: receive a command sent by a network side for deactivating or activating a data duplication of a bearer; and instruct other protocol layers of the terminal to deactivate or activate a data duplication function of the bearer.

Figure 8:
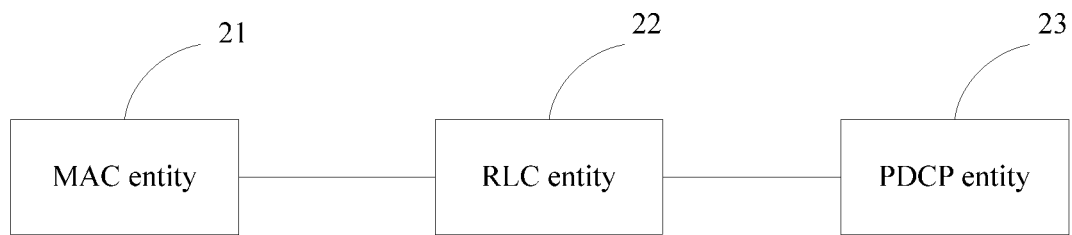
FIGS. 8 to 10 are schematic views of a terminal in the embodiments of the present disclosure.

As shown in FIG. 8, the terminal includes a MAC entity 21, an RLC entity 2 and a PDCP entity 23. When the network side activates or deactivates the PDCP data duplication function, after receiving a command for deactivating or activating a data duplication, one of the protocol layer entities of the terminal in this embodiment exchanges information among different protocol layers of the terminal after receiving a command for activating or deactivating the data duplication, to make the functions of different protocol layers to be coincident with each other after the PDCP duplication functions of the different protocol layers are activated or deactivated and make the behaviors of different protocol layer entities to be coincident with each other after the duplication is deactivated or activated, thereby reducing the waste of data transmission.

In the embodiment of the present disclosure, the MAC entity 21 is configured to receive a deactivating command or an activating command sent by the network side, instruct the other protocol layer entities of the terminal to deactivate or activate the data duplication function of the bearer;

where the deactivating command is configured to instruct deactivating the data duplication function of the bearer; the activating command is configured to instruct activating the data duplication function of the bearer; the other protocol layer entities include a Packet Data Convergence Protocol (PDCP) entity 23 and an Radio Link Control (RLC) entity 22; the deactivating command corresponds to an operation of deactivating the data duplication function of the bearer; and the activating command corresponds to an operation of activating the data duplication function of the bearer.

Further, the MAC entity 21 is configured to perform at least one of:

instructing the PDCP entity 23 of the bearer to deactivate or activate the data duplication function;

instructing the RLC entity 22 to deactivate or activate the data duplication function, where the RLC entity 22 is the one of which the data duplication function is to be deactivated or activated by the bearer.

Further, the MAC entity 22 is further configured to: determine, according to a configuration of the network side, the RLC entity 22 of which the data duplication function is to be deactivated or activated by the bearer.

Further, when deactivating the bearer, the PDCP entity 23 of the bearer is configured to perform at least one of:

discarding a duplicated data packet not sent successfully;

instructing the other protocol layer entities to discard the duplicated data packet not sent successfully.

Further, when deactivating the bearer, the MAC entity 21 is further configured to discard data of the RLC entity 22.

Figure 9:
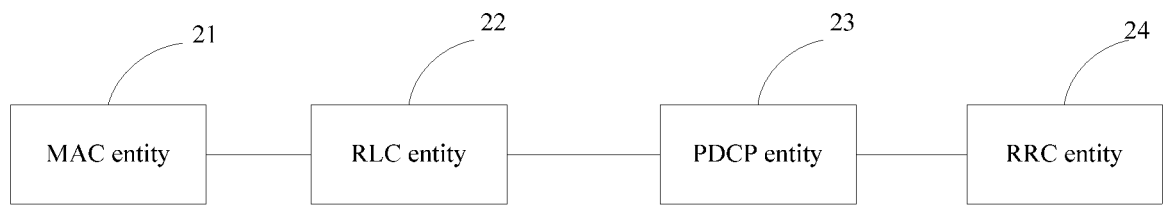

As shown in FIG. 9, the terminal includes a MAC entity 21, an RLC entity 2, a PDCP entity 23 and a RRC entity 24. When the network side activates or deactivates the PDCP data duplication function, after receiving a command for deactivating or activating a data duplication, one of the protocol layer entities of the terminal in this embodiment exchanges information among different protocol layers of the terminal after receiving a command for activating or deactivating the data duplication, to make the functions of different protocol layers to be coincident with each other after the PDCP duplication functions of the different protocol layers are activated or deactivated and make the behaviors of different protocol layer entities to be coincident with each other after the duplication is deactivated or activated, thereby reducing the waster of data transmission.

The RRC entity 24 is configured to receive a configuration command sent by a network side, where the configuration command is configured to configure a state of a data duplication of a bearer to be deactivating or activating, and instruct other protocol layer entities of the terminal to deactivate or activate the function of data duplication of the bearer, where the configuration command corresponds to an operation of deactivating or activating the data duplication function of the bearer, and the other protocol layer entities include a MAC entity 21, a PDCP entity 23, and an RLC entity 22.

Further, the RRC entity 24 is configured to perform at least one of:

instructing the PDCP entity 23 of the bearer to deactivate or activate the data duplication function;

instructing the RLC entity 22 to deactivate or activate the data duplication function, where the RLC entity 22 is the one of which the data duplication function is to be deactivated or activated by the bearer;

instructing the MAC entity 21 to deactivate or activate the data duplication function of the bearer.

Further, the RRC entity 24 is further configured to: determine, according to a configuration of the network side, the RLC entity 21 of which the data duplication function is to be deactivated or activated by the bearer.

Further, when deactivating the bearer, the MAC entity 21 is further configured to discard data of the RLC entity 22.

Further, when deactivating the bearer, the PDCP entity 23 is configured to perform at least one of:

discarding a duplicated data packet not sent successfully;

instructing the other protocol layer entities to discard the duplicated data packet not sent successfully.

Further, when discarding a duplicated data packet not sent successfully, the PDCP entity 23 is configured to perform:

discarding the duplicated data packet not sent successfully;

discarding a data packet to be sent to the RLC entity 22.

Further, when instructing the other protocol layer entities to discard the duplicated data packet not sent successfully, the PDCP entity 23 is configured to perform:

instructing the RLC entity 22 to discard the duplicated data packet not sent successfully;

instructing the MAC entity 21 to discard the duplicated data packet not sent successfully;

Further, when discarding the data packet of the RLC entity 22, the MAC entity 21 is further configured to perform at least one of:

discarding an RLC protocol data unit from the RLC entity 22;

discarding an MAC control signaling, where the MAC control signaling is generated according to the RLC protocol data unit.

A terminal is further provided in the embodiments of the present disclosure, including: a memory, a processor and a computer program stored in the memory and executable on the processor, and the computer program is executed by the processor to perform the method of activating and deactivating data duplication hereinabove, which may achieve the same technical effect. To avoid repetition, details thereof are not described herein again.

A computer-readable storage medium is provided in the embodiments of the present disclosure, where a computer program is stored in the computer-readable storage medium, and the computer program is executed by a processor to perform the method of activating and deactivating data duplication hereinabove, which can achieve the same technical effect. To avoid repetition, details thereof are not described herein again. The computer-readable storage medium includes a read-only memory (ROM), a random access memory (RAM), a magnetic disk or an optical disk.

Figure 10:
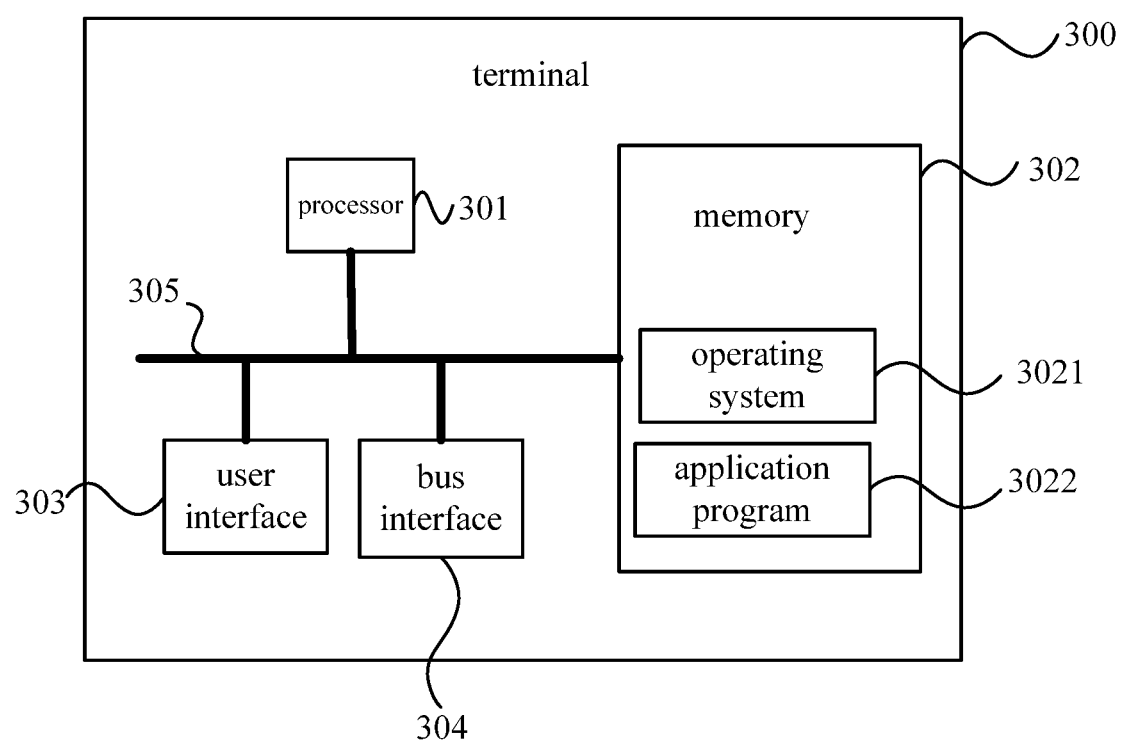

As shown in FIG. 10, a terminal is further provided in the embodiment of the present disclosure. The terminal 300 shown in FIG. 10 includes: at least one processor 301, memory 302, at least one network interface 304, and other user interfaces 303. The various components in the terminal 300 are coupled together through a bus system 305. It can be understood that the bus system 305 is configured to implement connection and communication between these components. The bus system 305 includes a power bus, a control bus, and a status signal bus in addition to the data bus. However, for the sake of clarity, various buses are labeled as the bus system 305 in FIG. 10.

The user interface 303 may include a display, a keyboard, or a pointing device (for example, a mouse, a trackball, a touch panel, or a touch screen).

It can be understood that the memory 302 in the embodiment of the present disclosure may be a volatile memory or a non-volatile memory, or may include both volatile and non-volatile memories. The non-volatile memory may be a read-only memory (ROM), a programmable read-only memory (PROM), an erasable programmable read-only memory (EROM), or Erase programmable EPROM (EEPROM) or flash memory. The volatile memory may be a Random Access Memory (RAM), which is used as an external cache. By way of example, but not limitation, many forms of RAM are available, such as Static Random Access Memory (SRAM), Dynamic Random Access Memory (DRAM), Synchronous Dynamic Random Access Memory (SDRAM), double data rate synchronous dynamic random access memory (DDRSDRAM), enhanced synchronous dynamic random access memory (ESDRAM), synchronous connection dynamic random access memory (Synchlink DRAM, SLDRAM), and Direct memory bus random access memory (DRRAM). The memory 302 of the systems and methods described herein is intended to include, but is not limited to, these and any other suitable types of memory.

In some embodiments, the memory 302 stores the following elements, executable modules or data structures, or a subset of them, or their extended set: an operating system 3021 and an application program 3022.

The operating system 3021 includes various system programs, such as a framework layer, a core library layer, and a driver layer, etc., and is configured to implement various basic services and process hardware-based tasks. The application program 3022 includes various application programs, such as a Media Player and a Browser, and is configured to implement various application services. A program for implementing the method of the embodiment of the present disclosure may be included in an application program 3022.

In an embodiment of the present disclosure, by calling a program or instruction stored in the memory 302, specifically the program or instruction stored in the application program 3022 may be executed, the computer program is executed by the processor 301 to:

enable a protocol layer entity of the terminal to instruct other protocol layers of the terminal to deactivate or activate a data duplication function of the bearer when receiving a command sent by a network side for deactivating or activating a data duplication of a bearer.

Optionally, the computer program is executed by the processor 301 to perform:

receiving, by the MAC entity of the terminal, a command sent by the network side for deactivating a data duplication of a bearer;

instructing, by the MAC entity, other protocol layer entities of the terminal to deactivate the data duplication function of the bearer.

Optionally, the computer program is executed by the processor 301 to perform:

instructing, by the MAC entity, the PDCP entity of the bearer to deactivate the data duplication function; and/or instructing, by the MAC entity, the RLC entity of which the data duplication function is to be deactivated by the bearer, to deactivate the data duplication function.

Optionally, the computer program is executed by the processor 301 to perform:

determining, by the MAC entity, according to a configuration of the network side, the RLC entity of which the data duplication function is to be deactivated by the bearer.

Optionally, the computer program is executed by the processor 301 to perform:

discarding, by the PDCP entity of the bearer, a duplicated data packet not sent successfully; and/or instructing the other protocol layer entities to discard the duplicated data packet not sent successfully.

Optionally, the computer program is executed by the processor 301 to perform:

discarding, by the PDCP entity of the bearer, any duplicated data packet that has not been successfully sent; and/or discarding, by the PDCP entity, a data packet to be sent to the RLC entity of which the PDCP duplication function is to be deactivated by the bearer.

Optionally, the computer program is executed by the processor 301 to perform:

instructing, by the PDCP entity, the RLC entity of which the data duplication function is to be deactivated by the bearer, to discard the duplicated data packet not sent successfully; and/or instructing, by the PDCP entity, the MAC entity to discard the duplicated data packet not sent successfully.

Optionally, the computer program is executed by the processor 301 to perform:

discarding, by the MAC entity, the data of the RLC entity of which the data duplication function is to be deactivated by the bearer.

Optionally, the computer program is executed by the processor 301 to perform:

discarding, by the MAC entity, an RLC protocol data unit from the RLC entity of which the data duplication function is to be deactivated by the bearer; and/or discarding, by the MAC entity, an MAC control signaling generated according to the RLC protocol data unit.

Optionally, the computer program is executed by the processor 301 to perform:

receiving, by the MAC entity of the terminal, a command sent by the network side for activating a data duplication of a bearer;

instructing, by the MAC entity, other protocol layer entities of the terminal to activate the data duplication function of the bearer, where the other protocol layer entities include a PDCP entity and an RLC entity.

Optionally, the computer program is executed by the processor 301 to perform:

instructing, by the MAC entity, the PDCP entity of the bearer to activate the data duplication function; and/or instructing, by the MAC entity, the RLC entity of which the data duplication function is to be activated by the bearer, to activate the PDCP duplication function.

Optionally, the computer program is executed by the processor 301 to perform:

determining, by the MAC entity, according to a configuration of the network side, the RLC entity of which the data duplication function is to be activated by the bearer.

Optionally, the computer program is executed by the processor 301 to perform:

receiving, by a RRC entity of the terminal, a configuration command sent by a network side, where the configuration command is configured to configure a state of a data duplication of a bearer to be deactivating.

instructing, by the RRC entity, other protocol layer entities of the terminal to deactivate a data duplication function of the bearer.

Optionally, the computer program is executed by the processor 301 to perform:

instructing, by the RRC entity, the PDCP entity of the bearer to deactivate the data duplication function; and/or instructing, by the RRC entity, the RLC entity of which the data duplication function is to be deactivated by the bearer, to deactivate the data duplication function; and/or instructing, by the RRC entity, the MAC entity of the bearer to deactivate the data duplication function of the bearer.

Optionally, the computer program is executed by the processor 301 to perform:

determining, by the RRC entity, according to a configuration of the network side, the RLC entity of which the data duplication function is to be deactivated by the bearer.

Optionally, the computer program is executed by the processor 301 to perform:

discarding, by the PDCP entity of the bearer, a duplicated data packet not sent successfully; and/or instructing the other protocol layer entities to discard the duplicated data packet not sent successfully.

Optionally, the computer program is executed by the processor 301 to perform:

discarding, by the PDCP entity of the bearer, any duplicated data packet that has not been successfully sent; and/or discarding, by the PDCP entity, a data packet to be sent to the RLC entity of which the PDCP duplication function is to be deactivated by the bearer.

Optionally, the computer program is executed by the processor 301 to perform:

instructing, by the PDCP entity, the RLC entity of which the data duplication function is to be deactivated by the bearer, to discard the duplicated data packet not sent successfully; and/or instructing, by the PDCP entity, the MAC entity to discard the duplicated data packet not sent successfully.

Optionally, the computer program is executed by the processor 301 to perform:

discarding, by the MAC entity, the data of the RLC entity of which the data duplication function is to be deactivated by the bearer.

Optionally, the computer program is executed by the processor 301 to perform:

discarding, by the MAC entity, an RLC protocol data unit from the RLC entity of which the PDCP duplication function is to be deactivated by the bearer; and/or discarding, by the MAC entity, an MAC control signaling generated according to the RLC protocol data unit.

Optionally, the computer program is executed by the processor 301 to perform:

receiving, by a RRC entity of the terminal, a configuration command sent by a network side, where the configuration command is configured to configure a state of a data duplication of a bearer to be activating;

instructing, by the RRC entity, other protocol layer entities of the terminal to activate a data duplication function of the bearer.

Optionally, the computer program is executed by the processor 301 to perform:

instructing, by the RRC entity, the PDCP entity of the bearer to activate the data duplication function; and/or instructing, by the RRC entity, the RLC entity of which the data duplication function is to be activated by the bearer, to activate the data duplication function; and/or instructing, by the RRC entity, the MAC entity of the bearer to activate the data duplication function of the bearer.

Optionally, the computer program is executed by the processor 301 to perform:

determining, by the RRC entity, according to a configuration of the network side, the RLC entity of which the data duplication function is to be activated by the bearer.

According to the above embodiment, when the network side activates or deactivates the PDCP data duplication function, one of the protocol layer entities of the terminal needs to exchange information among different protocol layers of the terminal after receiving a command for activating or deactivating the data duplication, to make the functions of different protocol layers to be coincident with each other after the PDCP duplication functions of the different protocol layers are activated or deactivated and make the UE behaviors of different protocol layer entities to be coincident with each other after the duplication is deactivated or activated, thereby reducing the waste of data transmission.

The terminal of the present disclosure may be a terminal such as a mobile phone, a tablet computer, a Personal Digital Assistant (PDA), or a vehicle-mounted computer.

The terminal 300 can implement the processes implemented by the terminal in the foregoing embodiments. To avoid repetition, details are not described herein again.

The methods disclosed in the foregoing embodiments of the present disclosure may be applied to the processor 301, or implemented by the processor 301. The processor 301 may be an integrated circuit chip and has a signal processing capability. In the implementation process, each step of the above method may be completed by using an integrated logic circuit of hardware in the processor 301 or an instruction in the form of software. The above-mentioned processor 301 may be a general-purpose processor, a digital signal processor (DSP), an application specific integrated circuit (ASIC), a Field Programmable Gate Array (FPGA), or other Programming logic devices, discrete gate or transistor logic devices, discrete hardware components. Various methods, steps, and logical block diagrams disclosed in the embodiments of the present disclosure may be implemented or executed. A general-purpose processor may be a microprocessor or the processor may be any conventional processor or the like. The steps of the method disclosed in combination with the embodiments of the present disclosure may be directly implemented by a hardware decoding processor, or may be performed by using a combination of hardware and software modules in the decoding processor. A software module may be located in a mature storage medium such as a random access memory, a flash memory, a read-only memory, a programmable read-only memory, or an electrically erasable programmable memory, a register, and the like. The storage medium is located in the memory 302, and the processor 301 reads the information in the memory 302 and completes the steps of the foregoing method in combination with its hardware.

It can be understood that the embodiments described herein may be implemented by hardware, software, firmware, middleware, microcode, or a combination thereof. For hardware implementation, the processing unit can be implemented in one or more Application Specific Integrated Circuits (ASIC), Digital Signal Processing (DSP), Digital Signal Processing Equipment (DSPD), a programmable logic device (PLD), a Field-Programmable Gate Array (FPGA), general-purpose processor, controller, microcontroller, microprocessor, and other electronic units for performing the functions described in this application Or a combination thereof.

For software implementation, the techniques described herein can be implemented through modules (e.g., procedures, functions, etc.) that perform the functions described herein. Software codes may be stored in a memory and executed by a processor. The memory may be implemented in the processor or external to the processor.

Each embodiment in this specification is described in a progressive manner. Each embodiment focuses on the differences from other embodiments, and the same or similar parts between the various embodiments may refer to each other.

Those skilled in the art should understand that the embodiments of the embodiments of the present disclosure may be provided as a method, an apparatus, or a computer program product. Therefore, the embodiments of the present disclosure may take the form of an entirely hardware embodiment, an entirely software embodiment, or an embodiment combining software and hardware aspects. Moreover, the embodiments of the present disclosure may take the form of a computer program product implemented on one or more computer-usable storage media (including but not limited to disk storage, CD-ROM, optical storage, etc.) containing computer-usable program code.

Embodiments of the present disclosure are described with reference to flowcharts and/or block diagrams of methods, terminal devices (systems), and computer program products according to embodiments of the present disclosure. It should be understood that each process and/or block in the flowcharts and/or block diagrams, and combinations of processes and/or blocks in the flowcharts and/or block diagrams can be implemented by computer program instructions. These computer program instructions may be provided to a processor of a general purpose computer, special purpose computer, embedded processor, or other programmable data processing terminal device to produce a machine, such that the instructions executed by the processor of the computer or other programmable data processing terminal device Means are generated for implementing the functions specified in one or more flowcharts and/or one or more blocks of the block diagrams.

These computer program instructions may also be stored in a computer-readable memory capable of directing a computer or other programmable data processing terminal device to work in a specific manner, such that the instructions stored in the computer-readable memory produce a manufactured article including the instruction means, the instruction means implements the functions specified in one or more flowcharts and/or one or more blocks of the block diagram.

These computer program instructions can also be loaded on a computer or other programmable data processing terminal device, so that a series of operation steps can be performed on the computer or other programmable terminal device to produce a computer-implemented process, so that the computer or other programmable terminal device can The instructions executed on the steps provide steps for implementing the functions specified in one or more of the flowcharts and/or one or more of the block diagrams.

Although some embodiments of the present disclosure have been described, those skilled in the art can make other changes and modifications to these embodiments once they know the basic concepts. Therefore, the claims are intended to be construed to include the embodiments and all changes and modifications that fall within the scope of the embodiments of the disclosure.

It should also be noted that in this article, relational terms such as first and second are used only to distinguish one entity or operation from another entity or operation, and do not necessarily require or imply these entities or operations There is any such actual relationship or order among them. Moreover, the terms "including", "comprising", or any other variation thereof are intended to encompass non-exclusive inclusion, such that a process, method, article, or terminal device that includes a series of elements includes not only those elements but also those that are not explicitly listed Other elements, or elements inherent to such a process, method, article, or terminal. Without more restrictions, the elements defined by the sentence "including a . . . " do not exclude the existence of other identical elements in the process, method, article, or terminal device including the elements.

The above are only some embodiments of the present disclosure, but the scope of the present disclosure is not limited thereto, and any person skilled in the art may easily think of changes or substitutions within the technical scope of the present disclosure. It should be covered by the scope of the present disclosure.

What is claimed is:

1. A method of activating and deactivating a data duplication, applied to a terminal, comprising:
   receiving, by a protocol layer entity of the terminal, a command sent by a network side for deactivating or activating a data duplication of a bearer; and
   instructing, by the protocol layer entity, other protocol layers of the terminal to deactivate or activate a data duplication function of the bearer;
   wherein the other protocol layers comprises a Packet Data Convergence Protocol (PDCP) entity;
   subsequent to the instructing, by the protocol layer entity, the other protocol layers of the terminal to deactivate the data duplication function of the bearer, the method further comprises:
   instructing, by the PDCP entity, a Radio Link Control (RLC) entity to discard duplicated data packet not sent successfully.

2. The method according to claim 1, wherein the receiving by the protocol layer entity of the terminal the command sent by the network side for deactivating or activating the data duplication of the bearer comprises:
   receiving, by a Medium Access Control (MAC) entity of the terminal, a deactivating command or an activating command sent by the network side;
   the instructing by the protocol layer entity the other protocol layers of the terminal to deactivate or activate the data duplication function of the bearer comprises:
   instructing, by the MAC entity, the other protocol layer entities of the terminal to deactivate or activate the data duplication function of the bearer;
   wherein the deactivating command is configured to instruct deactivating the data duplication function of the bearer; the activating command is configured to instruct activating the data duplication function of the bearer; the other protocol layer entities comprise the PDCP entity and the RLC entity; the deactivating command corresponds to an operation of deactivating the data duplication function of the bearer; and the activating command corresponds to an operation of activating the data duplication function of the bearer.

3. The method according to claim 2, wherein the instructing by the MAC entity the other protocol layer entities of the terminal to deactivate or activate the data duplication function of the bearer comprises at least one of:
   instructing, by the MAC entity, the PDCP entity of the bearer to deactivate or activate the data duplication function;
   instructing, by the MAC entity, the RLC entity to deactivate or activate the data duplication function, wherein the RLC entity is the one of which the data duplication function is to be deactivated or activated by the bearer.

4. The method according to claim 3, wherein prior to the instructing by the MAC entity the RLC entity to deactivate or activate the data duplication function, the method further comprises:
   determining, by the MAC entity, according to a configuration of the network side, the RLC entity of which the data duplication function is to be deactivated or activated by the bearer.

5. The method according to claim 3, wherein subsequent to the instructing by the MAC entity the PDCP entity of the bearer to deactivate or activate the data duplication function, the method further comprises at least one of:
   discarding, by the PDCP entity of the bearer, a duplicated data packet not sent successfully;
   instructing the other protocol layer entities to discard the duplicated data packet not sent successfully.

6. The method according to claim 5, wherein the discarding by the PDCP entity of the bearer the duplicated data packet not sent successfully comprises at least one of:
   discarding, by the PDCP entity, the duplicated data packet not sent successfully;
   discarding, by the PDCP entity, a data packet to be sent to the RLC entity.

7. The method according to claim 5, wherein instructing the other protocol layer entities to discard the duplicated data packet not sent successfully comprises:
   instructing, by the PDCP entity, the MAC entity to discard the duplicated data packet not sent successfully.

8. The method according to claim 3, wherein prior to, subsequent to or meanwhile the instructing by the MAC entity the other protocol layer entities of the terminal to deactivate or activate the data duplication function of the bearer the method further comprises:
   discarding, by the MAC entity, data of the RLC entity.

9. The method according to claim 1, wherein the receiving by the protocol layer entity of the terminal the command sent by the network side for deactivating or activating the data duplication of the bearer comprises:

receiving, by a Radio Resource Control (RRC) entity of the terminal, a configuration command sent by the network side, wherein the configuration command is configured to configure a deactivating or activating state of the data duplication of the bearer;

the instructing by the protocol layer entity the other protocol layers of the terminal to deactivate or activate the data duplication function of the bearer comprises:

instructing, by the RRC entity, the other protocol layers of the terminal to deactivate or activate the data duplication function of the bearer;

wherein the configuration command corresponds to an operation of deactivating or activating the data duplication function of the bearer, the other protocol layers comprise an MAC entity, a PDCP entity and an RLC entity.

10. The method according to claim 9, wherein the instructing by the RRC entity the other protocol layers of the terminal to deactivate or activate the data duplication function of the bearer comprises at least one of:

instructing, by the RRC entity, the PDCP entity of the bearer to deactivate or activate the data duplication function;

instructing, by the RRC entity, the RLC entity to deactivate or activate the data duplication function, wherein the RLC entity is the one of which the data duplication function is to be deactivated or activated by the bearer;

instructing, by the RRC entity, the MAC entity to deactivate or activate the data duplication function of the bearer;

or, prior to the instructing by the RRC entity the other protocol layers of the terminal to deactivate or activate the data duplication function of the bearer, the method further comprises:

determining, by the RRC entity, according to a configuration of the network side, the RLC entity of which the data duplication function is to be deactivated or activated by the bearer.

11. The method according to claim 10, wherein subsequent to the instructing by the RRC entity the MAC entity of the bearer to deactivate or activate the data duplication function of the bearer, the method further comprises:

discarding, by the MAC entity, data of the RLC entity;

or, subsequent to the instructing by the RRC entity the PDCP entity of the bearer to deactivate or activate the data duplication function, the method further comprises at least one of:

discarding, by the PDCP entity of the bearer, a duplicated data packet not sent successfully;

instructing the other protocol layer entities to discard the duplicated data packet not sent successfully.

12. A terminal, comprising a plurality of protocol layer entities, wherein the protocol layer entity is configured to:

receive a command sent by a network side for deactivating or activating a data duplication of a bearer; and instruct other protocol layers of the terminal to deactivate or activate a data duplication function of the bearer;

wherein the other protocol layers comprises a Packet Data Convergence Protocol (PDCP) entity;

wherein the PDCP entity is configured to instruct a Radio Link Control (RLC) entity to discard duplicated data packet not sent successfully.

13. The terminal according to claim 12, further comprising:

an Medium Access Control (MAC) entity, configured to receive a deactivating command or an activating command sent by the network side, instruct the other protocol layer entities of the terminal to deactivate or activate the data duplication function of the bearer;

wherein the deactivating command is configured to instruct deactivating the data duplication function of the bearer; the activating command is configured to instruct activating the data duplication function of the bearer; the other protocol layer entities comprise the PDCP entity and the RLC entity; the deactivating command corresponds to an operation of deactivating the data duplication function of the bearer; and the activating command corresponds to an operation of activating the data duplication function of the bearer.

14. The terminal according to claim 13, wherein the MAC entity is configured to perform at least one of:

instructing the PDCP entity of the bearer to deactivate or activate the data duplication function;

instructing the RLC entity to deactivate or activate the data duplication function, wherein the RLC entity is the one of which the data duplication function is to be deactivated or activated by the bearer.

15. The terminal according to claim 14, wherein the MAC entity is further configured to:

determine, according to a configuration of the network side, the RLC entity of which the data duplication function is to be deactivated or activated by the bearer.

16. The terminal according to claim 15, further comprising the PDCP entity of the bearer configured to perform at least one of:

discarding a duplicated data packet not sent successfully;

instructing the other protocol layer entities to discard the duplicated data packet not sent successfully.

17. The terminal according to claim 12, further comprising a Radio Resource Control (RRC) entity configured to:

receive a configuration command sent by the network side, wherein the configuration command is configured to configure a deactivating or activating state of the data duplication of the bearer; and instruct the other protocol layers of the terminal to deactivate or activate the data duplication function of the bearer;

wherein the configuration command corresponds to an operation of deactivating or activating the data duplication function of the bearer, the other protocol layers comprise an MAC entity, a PDCP entity and an RLC entity.

18. The terminal according to claim 17, wherein the RRC entity is configured to perform at least one of:

instructing the PDCP entity of the bearer to deactivate or activate the data duplication function;

instructing the RLC entity to deactivate or activate the data duplication function, wherein the RLC entity is the one of which the data duplication function is to be deactivated or activated by the bearer;

instruct the MAC entity to deactivate or activate the data duplication function of the bearer;

or, the RRC entity is further configured to determine, according to a configuration of the network side, the RLC entity of which the data duplication function is to be deactivated or activated by the bearer.

19. The terminal according to claim 18, further comprising the MAC entity configured to discard data of the RLC entity;
or,
the terminal further comprises the PDCP entity of the bearer configured to perform at least one of:
discarding a duplicated data packet not sent successfully;
instructing the other protocol layer entities to discard the duplicated data packet not sent successfully.

20. A computer-readable storage medium, wherein a computer program is stored in the computer-readable storage medium, and the computer program is executed by a processor to perform:
receiving a command sent by a network side for deactivating or activating a data duplication of a bearer; and
instructing other protocol layers of the terminal to deactivate or activate a data duplication function of the bearer;
wherein the other protocol layers comprises a Packet Data Convergence Protocol (PDCP) entity;
subsequent to the instructing the other protocol layers of the terminal to deactivate the data duplication function of the bearer, the computer program is executed by the processor to perform:
instructing a Radio Link Control (RLC) entity to discard duplicated data packet not sent successfully.

\* \* \* \* \*